United States Patent
Popplewell et al.

(10) Patent No.: US 6,907,553 B2
(45) Date of Patent: Jun. 14, 2005

(54) METHOD AND APPARATUS FOR ESTIMATION OF ERROR IN DATA RECOVERY SCHEMES

(75) Inventors: Andrew Popplewell, Manchester (GB); Paul C. Gregory, Bolton (GB)

(73) Assignee: LSI Logic Corporation, Milpitas, CA (US)

( * ) Notice: Subject to any disclaimer, the term of this patent is extended or adjusted under 35 U.S.C. 154(b) by 674 days.

(21) Appl. No.: 09/883,761

(22) Filed: Jun. 18, 2001

(65) Prior Publication Data

US 2002/0083360 A1 Jun. 27, 2002

(30) Foreign Application Priority Data

Oct. 31, 2000 (GB) .............................................. 0026614

(51) Int. Cl.[7] .......................... G06F 11/00; H04L 25/40
(52) U.S. Cl. ............................ 714/704; 375/371; 714/2
(58) Field of Search ............................... 714/704–707, 714/752, 2; 375/355, 371; 360/53

(56) References Cited

U.S. PATENT DOCUMENTS

| | | | |
|---|---|---|---|
| 3,721,959 A | | 3/1973 | George |
| 4,234,954 A | * | 11/1980 | Lange et al. ................. 714/709 |
| 4,387,461 A | * | 6/1983 | Evans ......................... 714/704 |
| 5,297,869 A | * | 3/1994 | Benham ....................... 375/361 |
| 5,828,678 A | * | 10/1998 | Mock .......................... 714/815 |
| 6,363,111 B1 | * | 3/2002 | Hee et al. .................... 375/224 |
| 6,549,587 B1 | * | 4/2003 | Li .............................. 375/326 |
| 6,577,690 B1 | * | 6/2003 | Barman et al. ............. 375/654 |
| 6,606,360 B1 | * | 8/2003 | Dunning et al. ............ 375/354 |

OTHER PUBLICATIONS

"Estimation of the Percentile Maximum Time Interval Error of Gaussian White Phase Noise" Bregni et al. IEEE International Conference on Communications, Jun. 8–12, 1997 pp.: 1597–1601 vol. 3Inspec Accession No.: 5793974.*

* cited by examiner

Primary Examiner—Albert Decady
Assistant Examiner—Cynthia Britt
(74) Attorney, Agent, or Firm—Christopher P. Maiorana PC

(57) ABSTRACT

An on-chip data independent method and apparatus for channel error estimation in a data recovery scheme is based on measuring phase noise statistics. The apparatus (10) receives a data pulse and four quadrature clock signals and has a discriminating device (11) to provide a count signal for each data pulse received depending on which clock signal was the first to clock the particular data pulse. A pair of counters (12 and 13) counts the number of data pulses received at different phase offsets to provide a value representing a statistical ratio of the counts at different clock phase offsets from which an error rate for the received data pulses based on the counts at different clock phase offsets can be determined from a look-up table (16). By re-configuring the circuitry, the system can be adapted to measure clock window asymmetry.

19 Claims, 4 Drawing Sheets

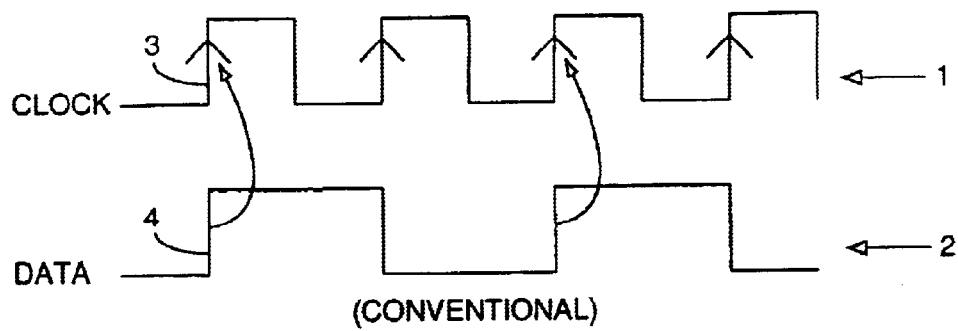
(CONVENTIONAL)
FIG. 1
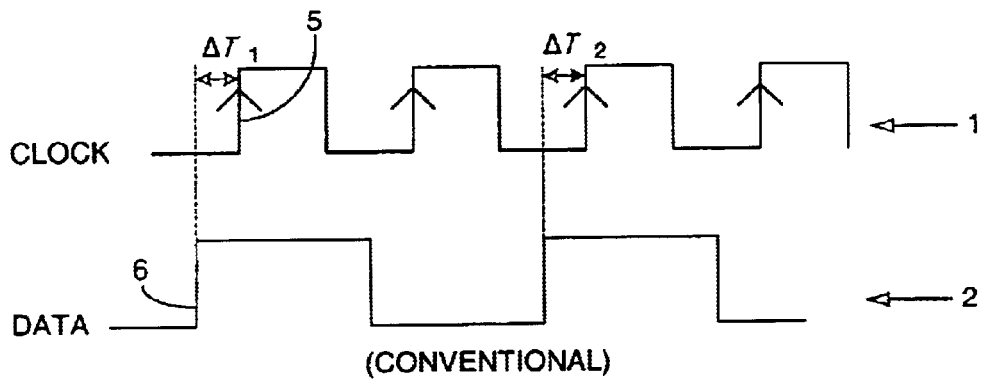
(CONVENTIONAL)
FIG. 2

METHOD AND APPARATUS FOR ESTIMATION OF ERROR IN DATA RECOVERY SCHEMES

This application claims the benefit of United Kingdom Application No. 0026614.8 filed Oct. 31, 2000.

FIELD OF THE INVENTION

This invention relates to a method and apparatus for estimation of error in data recovery schemes.

BACKGROUND OF THE INVENTION

In digital data recovery schemes, it is desirable to be able to provide an on-chip method for estimating the quality of recovered data which is independent of data patterns. The quality information can then provide a figure of merit for enabling key system parameters to be optimized. The measure of channel data quality is the average bit-error-rate (BER) and in some conventional schemes has been achieved by measuring the frequency of amplitude deviation from a specified reference level.

For example, U.S. Pat. No. 4,234,954 discloses an on-line circuit configured to estimate the bit error rate (BER) of a binary data signal stream in the presence of noise uncorrelated with the signal. For a binary data signal having two states (i.e., plus V and minus V) biased around a specified reference level (REF), the circuit counts the number of instances in which the received signal deviates more than 2V from the reference level REF. The accumulated count provides an accurate estimate of the BER over several orders of magnitude variation of the BER.

U.S. Pat. No. 3,721,959 discloses a method and means of error rate detection. The scheme (i) develops an eye pattern analog signal of transmitted digital data, defining a region within the eye pattern as an unacceptable area through which the eye pattern may not transgress and (ii) counts, as an erroneous signal, each transgression of the analog signal into the region. The drawback of such conventional schemes is the error rate estimation. The error rate estimation is not reflective of errors induced by clock jitter.

Another conventional method for estimating the channel BER can be obtained by measuring the statistics of the phase errors (i.e., the time between a clock edge and a data edge). Such a method takes into account errors induced by both noise on the input data signal and clock jitter. As shown in FIG. 1, in an ideal system the clock signal 1 and the data signal 2 should have edges 3, 4 which are co-incident. However, due to channel imperfections, the position of the clock edge 5 relative to the data edge 6 will vary as shown in FIG. 2. Furthermore, the average error may not have a mean of zero. A data error will occur if the time, $\Delta T$ (or phase error), between the clock edge 5 and the data edges 6 is $>\frac{1}{2}$ or $<-\frac{1}{2}$, where $\Delta T$ has been normalized to the clock period T (i.e., if the data falls in the wrong clock window). Thus, the phase error statistics enable an estimate of the average channel performance to be predicted. For example, though the phase noise probability density function (pdf) is not a simple function, it will typically be Gaussian. Therefore, to evaluate the probability of error in a system requires a complex integral to be evaluated.

SUMMARY OF THE INVENTION

One aspect of the invention concerns a method of estimating an error in a data recovery system, comprising the steps of (A) receiving one or more data pulses each having a data rate, (B) receiving a plurality of clock signals each having a rate similar to the data rate and having a substantially equal phase offset from each other, (C) clocking the one or more data pulses with each of the plurality of clock signals to determine a particular offset of each of the one or more data pulses, (D) counting a number of said one or more data pulses received at different phase offsets, (E) providing a value representing a ratio of the counts at different clock phase offsets, and (F) determining said error for the received data pulses in response to the value.

BRIEF DESCRIPTION OF THE DRAWINGS

These and other objects, features and advantages of the present invention will be apparent from the following detailed description and the appended claims and drawings in which:

FIG. 1 is a schematic diagram of clock and data signals in an ideal system;

FIG. 2 is a schematic diagram of clock and data signals in most real systems;

DETAILED DESCRIPTION OF THE PREFERRED EMBODIMENTS

Figure 3:
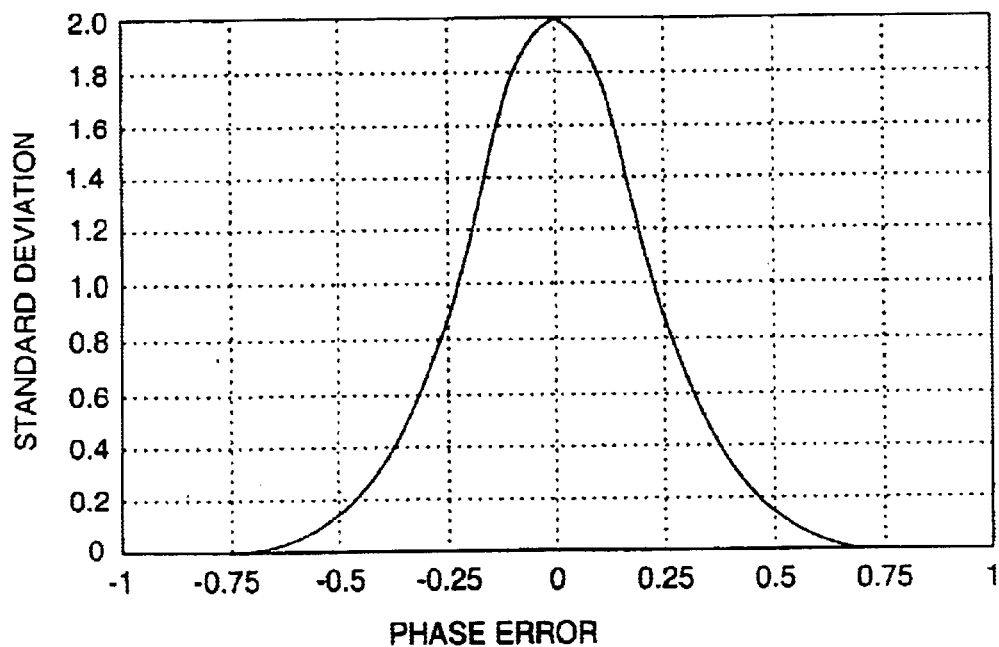
FIG. 3 is a graph of a probability density function for Gaussian distributed phase error having a standard deviation of 0.2 used with the present invention.

The present invention may provide a method and apparatus for estimation of error in data recovery schemes which may overcome or reduce BER concerns. Accordingly, in a first aspect, the invention may provide a method of estimating an error in a data recovery system. The method comprising the steps of receiving data pulses at a data rate, receiving a plurality of clock signals, the clock signals having the same rate as the data rate but being substantially equally phase offset from one another, clocking the data pulses with each of the clock signals to determine at which phase offset each data pulse is received, counting the number of data pulses received at different phase offsets to provide a value representing a statistical ratio of the counts at different clock phase offsets, and utilizing the value representing the statistical ratio to determine an error for the received data pulses. In a preferred embodiment, the step of clocking the data pulse may comprise applying the data pulses to each of a plurality of registers, each clocked by a different one of the plurality of clock signals, and determining which of the plurality of registers first clocks each data pulse.

The step of counting the number of data pulses received at different phase offsets may further comprise incrementing one of a plurality of counters each time a register associated with the counter is determined to have first clocked a particular data pulse and determining the count of at least one counter when at least one other counter reaches a predetermined value. The step of utilizing the value representing the statistical ratio to determine an error may further comprise checking a look-up table for an error rate corresponding to the value. Additionally, in one embodiment, four clock signals which are in a quadrature phase relation may be provided.

The step of counting the number of data pulses received at different phase offsets may further comprise incrementing a first counter when either one of two registers clocked by clock signals has phase offsets of 0° and 90° for a particular data pulse or incrementing a second counter when either one of two registers clocked by clock signals has phase offsets of 180° and 270° for a particular data pulse, determining when one of the two counters reaches a predetermined value, and determining the count of the other of the two counters. The count of the other counter may then be used to determine an error rate from a look-up table.

Preferably, the step of counting the number of data pulses received at different phase offsets comprises incrementing a first counter when either one of two registers clocked by clock signals having phase offsets of 0° and 270° first clocks a particular data pulse or incrementing a second counter when either one of two registers clocked by clock signals having phase offsets of 90° and 180° first clocks a particular data pulse, determining when one of the two counters reaches a predetermined value, and determining the count of the other of the two counters. The count of the other counter may then be compared to the predetermined value and used to determine whether a skew error is positive or negative.

According to a second aspect of the present invention an apparatus for estimating an error in a data recovery system is provided. The apparatus generally comprises a data terminal, data clocking device, a plurality of clock inputs, a plurality of counters, and a device. The data terminal may be configured to receive data pulses at a data rate. The plurality of clock input terminals may receive a plurality of clock signals. The clock signals may have the same rate as the data rate. However, the clock signals may have a substantially equal amount of phase offset from each other. The data clocking device may have a data input coupled to the data terminal, a plurality of clock inputs coupled to the plurality of clock input terminals and a plurality of outputs, each providing a count signal when a data pulse is clocked by a clock signal at an associated clock input. The plurality of counters may each have a count input coupled to at least one of the plurality of outputs of the data clocking device for counting the number of data pulses received at different phase offsets to provide a value representing a statistical ratio of the counts at different clock phase offsets. The device may have an input coupled to the output of at least one of the plurality of counters and an output to provide an error for the received data pulses based on the counts at different clock phase offsets.

In one embodiment, the data clocking device may comprise a plurality of registers. Each of the registers may have a first input coupled to the data input, a second input and an output. Each of the second inputs of the plurality of registers may be coupled to a different one of the plurality of clock inputs. A discriminating device may have a plurality of inputs coupled to the outputs of the plurality of registers and a second plurality of outputs. Only one of the outputs provides a count signal for each data pulse received depending on which register was the first to clock the particular data pulse.

Preferably, at least one counter has a maximum value associated therewith and provides an indication at an output thereof when that maximum value has been reached. At least one other counter provides, at an output thereof, an indication of the value it has reached when at least one counter has reached the maximum value. In one example there are four clock signals which are in a quadrature phase relation. Preferably, there are four registers, each receiving one of the four clock signals at the second input thereof.

The discriminating device may comprise a four input NOR gate, a plurality of multiplexers, a plurality of second registers, a first gate and a second gate. The four inputs of the NOR gate may be coupled to the four outputs of the four registers and may have an output. The four multiplexers may each have a first input coupled to a respective output of a respective one of the four registers, a second input coupled to an output of the multiplexer, and a control input coupled to the output of the NOR gate. The plurality of second registers may each have a first input coupled to a respective output of a respective multiplexer, a clock input coupled to receive a system clock signal, and an output. The first gate (e.g., and OR gate) may have first and second inputs coupled to the outputs of two of the second registers and an output. The second gate (e.g., an OR gate) may have first and second inputs coupled to the outputs of the other two second registers and an output.

The first OR gate preferably has a first and second input coupled to the outputs of the two second registers corresponding to the two registers clocked by clock signals having phase offsets of 0° and 90°. The second OR gate has a first and second input coupled to the outputs of the two second registers corresponding to the two registers clocked by clock signals having phase offsets of 180° and 270°.

Preferably, a first counter is incremented when either one of two registers clocked by clock signals having phase offsets of 0° and 90° first clocks a particular data pulse. A second counter is incremented when either one of two registers clocked by clock signals having phase offsets of 180° and 270° first clocks a particular data pulse. The device preferably includes a look-up table which provides an error rate for the received data pulses based on the ratio of the values of the two counters.

Preferably, the first OR gate may have a first and second input coupled to the outputs of the two second registers corresponding to the two registers clocked by clock signals having phase offsets of 0° and 270°. The second OR gate may have a first and second input coupled to the outputs of the two second registers corresponding to the two registers clocked by clock signals having phase offsets of 90° and 180°.

In one embodiment, a first counter is incremented when either one of two registers clocked by clock signals having phase offsets of 0° and 270° first clocks a particular data pulse and a second counter is incremented when either one of two registers clocked by clock signals having phase offsets of 90° and 180° first clocks a particular data pulse. The device includes a comparator to determine which of the two counters has a higher value so as to provide an indication of whether a skew error is positive or negative.

Thus, as shown in FIG. 1, and as described above, in an ideal system the clock signal 1 and the data signal 2 should have edges 3, 4 which are co-incident. However, in practice (e.g., due to channel imperfections) the position of the clock edge 5 relative to the data edge 6 will vary (see FIG. 2). A data error will occur if the time, $\Delta T$ (or phase error), between the clock edge 5 and the data edges 6 is $>\frac{1}{2}$ or $<-\frac{1}{2}$, where $\Delta T$ has been normalized to the clock period (i.e., if the data falls in the wrong clock window). Thus, knowledge of the phase error statistics enables an estimate of the average channel performance to be predicted. In general, though, the phase noise probability density function (pdf) is not a simple function, and typically it will be Gaussian, as shown in FIG. 3.

For this case, if X is a random variable which represents the phase errors in a system and if it is assumed that X is Gaussian distributed with a mean and variance $\sigma^2$, then the pdf is given by:

$$p(x) = \frac{1}{\sigma\sqrt{2\pi}} e^{-\frac{x^2}{2\sigma^2}}$$

Therefore the probability of a phase error $>\alpha$ is:

$$Prob(X > \alpha) = \frac{1}{\sigma\sqrt{2\pi}} \int_\alpha^\infty e^{-\frac{x^2}{2\sigma^2}} dx \qquad (1)$$

It should be noted that Prob $(X>\alpha)=$Prob $(X<-\alpha)$

Given that an error is made if $|\Delta T|>\frac{1}{2}$ from equation (1), the following equation for the probability of error, $P_{err}$ can be obtained:

$$P_{err} = \frac{1}{K}\left(\frac{1}{\sigma\sqrt{2\pi}} \int_{\frac{1}{2}}^\infty e^{-\frac{x^2}{2\sigma^2}} dx + \frac{1}{\sigma\sqrt{2\pi}} \int_{-\infty}^{-\frac{1}{2}} e^{-\frac{x^2}{2\sigma^2}} dx\right) \qquad (2)$$

which may be written as:

$$P_{err} = \frac{2}{K\sigma\sqrt{2\pi}} \int_{\frac{1}{2}}^\infty e^{-\frac{x^2}{2\sigma^2}} dx \qquad (3)$$

where K is a constant representing the average rate of phase error updates normalized to the clock period.

Similarly, the following equation for the probability of $|\Delta T|>\frac{1}{4}$ can be obtained:

$$Prob\left(|\Delta T| > \frac{T}{4}\right) = \frac{2}{\sigma\sqrt{2\pi}} \int_{\frac{1}{4}}^\infty e^{-\frac{x^2}{2\sigma^2}} dx \qquad (4)$$

and $$Prob\left(|\Delta T| < \frac{T}{4}\right) = 1 - \frac{2}{\sigma\sqrt{2\pi}} \int_{\frac{1}{4}}^\infty e^{-\frac{x^2}{2\sigma^2}} dx \qquad (5)$$

For various values of $\sigma$, the corresponding values of equations (3) and (5) can be tabulated, as shown in Table 1, which shows these values for K=5.

TABLE 1

| $\sigma$ | equation (3) | equation (5) |
| --- | --- | --- |
| 0.1 | $1 \times 10^{-7}$ | 0.9875 |
| 0.11 | $1 \times 10^{-6}$ | 0.9770 |
| 0.125 | $1 \times 10^{-5}$ | 0.9545 |
| 0.145 | $1 \times 10^{-4}$ | 0.9150 |
| 0.18 | $1 \times 10^{-3}$ | 0.8350 |
| 0.2575 | $1 \times 10^{-2}$ | 0.6666 |

Thus, if an estimate for the value of equation (5) can be deduced, then, with the aid of Table 1, the corresponding value for equation (3) and hence an estimate of the error rate can be found.

Figure 4:
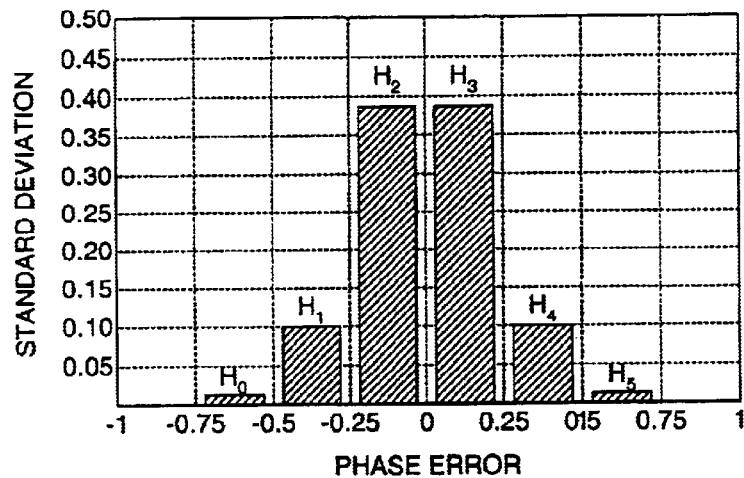
FIG. 4 is a coarse histogram with spacing of T/4 for the distribution of FIG. 3 used with the present invention.

To find an estimate for the value of equation (5), the data edge pulse is clocked with four clocks running at the data rate but in quadrature phase denoted as CLK0, CLK90, CLK180 and CLK270. The four clock phases can be used to create a coarse histogram of the phase error distribution where the resolution is T/4. FIG. 3 shows the pdf for a Gaussian distributed phase error with s=0.2 and FIG. 4 shows a coarse histogram with spacing T/4 for the same distribution. In FIG. 3 the terms A0, A1, A2, A3, A4 and A5 represent the areas under the curve in the x-axis regions DT<-½, -½ d DT<-¼, '¼d DT<0,0 d DT<¼, ¼ d DT<½ and $\Delta T>\frac{1}{2}$ respectively. In FIG. 4 the terms H0, H1 H2, H3, H4 and H5 represent the heights of the histogram columns which are equivalent to the areas A0, A1, A2, A3, A4 and A5 in FIG. 3 (i.e., the probability of a phase error falling in these regions). The Prob($|\Delta T|<T/4$) can be defined as:

$$Prob\left(|\Delta T| < \frac{T}{4}\right) = A2 + A3 \qquad (6)$$

An estimate for the term A2+A3 can be deduced using the four quadrature phase clocks, where an estimate for equation (5) can be found (and hence an estimate for equation (3)). One embodiment of an apparatus which can be used to calculate A2+A3 will now be described.

Figure 5:
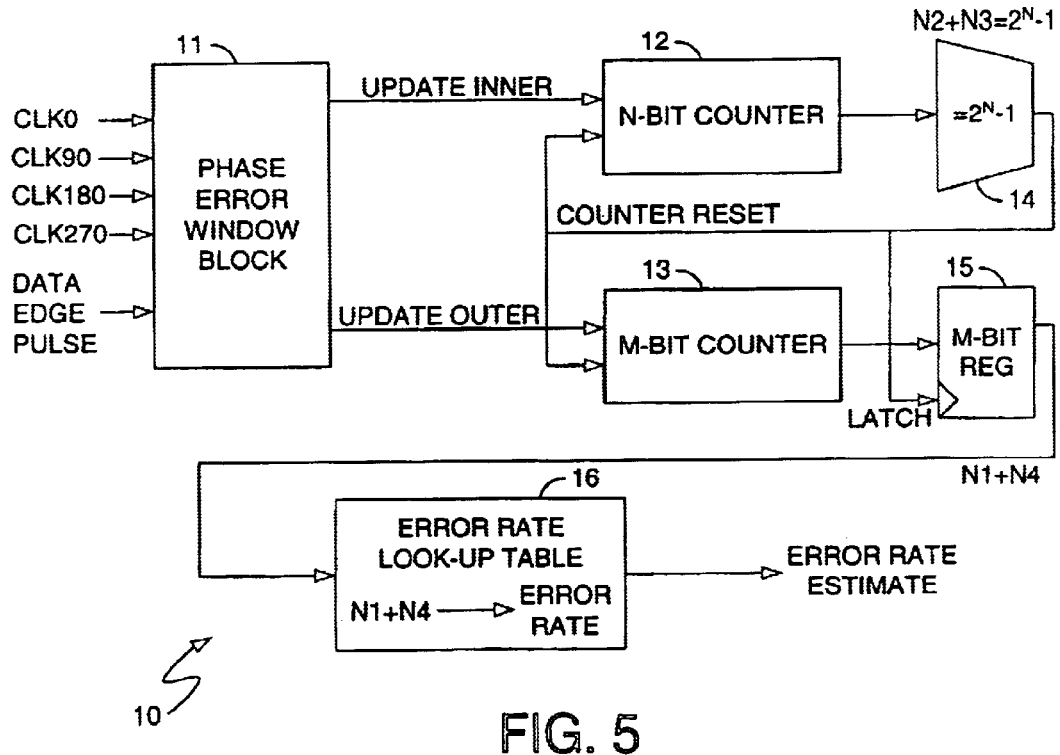
FIG. 5 is a schematic block diagram of a first embodiment of an apparatus for estimating an error in a data recovery system according to the present invention.

FIG. 5 shows an outline block diagram of an apparatus 10 having a phase error window block 11, a pair of counters 12 and 13, a comparator 14, a register 15, and a memory 16 having a look-up table stored therein. The phase error window block 11 receives four clock inputs, which are in quadrature with each other, labelled CLK0, CLK90, CLK180 and CLK270 and a data edge pulse. The phase error window block 11 determines which phase window the phase error falls into and provides signals which update the counters 12 and 13. The first (N-bit) counter 12 records the number of phase errors falling into the windows $-\frac{1}{4}$ d $\Delta T<0$ and 0 d $\Delta T<\frac{1}{4}$ (e.g. n2+n3) and the second (M-bit) counter 13 records the number of phase errors falling into the windows $-\frac{1}{2}$ d $\Delta T<-\frac{1}{4}$ and ¼ d $\Delta T<\frac{1}{2}$ (e.g. n1+n4). The comparator 13 is used to determine when the first counter 12 reaches a limit of $2^N-1$. When this occurs, the value in the second counter 13 is latched into the register 15 and both counters 12 and 13 are reset for the process to be repeated. The latched value in register 15 is then used to estimate A2+A3 as:

$$A2 + A3 \approx \frac{n2 + n3}{n1 + n2 + n3 + n4} = \frac{2^n - 1}{2^n - 1 + n1 + n4} \qquad (7)$$

The approximation can be used because although phase errors of the type $|\Delta T|>\frac{1}{2}$, (i.e., the terms A0 and A5 in the Gaussian curve of FIG. 3) are not guaranteed to be counted correctly, these occurrences will be relatively rare and can be ignored as they will have a negligible effect on accuracy. Equation (7) can thus be used with the aid of a look-up table to deduce the error rate. Clearly, if N is fixed, then the look-up table can simply map the value of n1+n4 to a precalculated error rate stored in the memory 16. The size of the first and second counters 12 and 13 is dependent on the error rate range over which the measurements are to operate and the required accuracy. To cater for error rate ranges from $10^{-2}$ to $10^{-7}$, a N value of 10 and a M value of 8 is sufficient to provide good accuracy and would provide a new error rate estimation update approximately every 1100 phase error comparisons (the actual frequency would be dependent on the channel noise).

Figure 6:
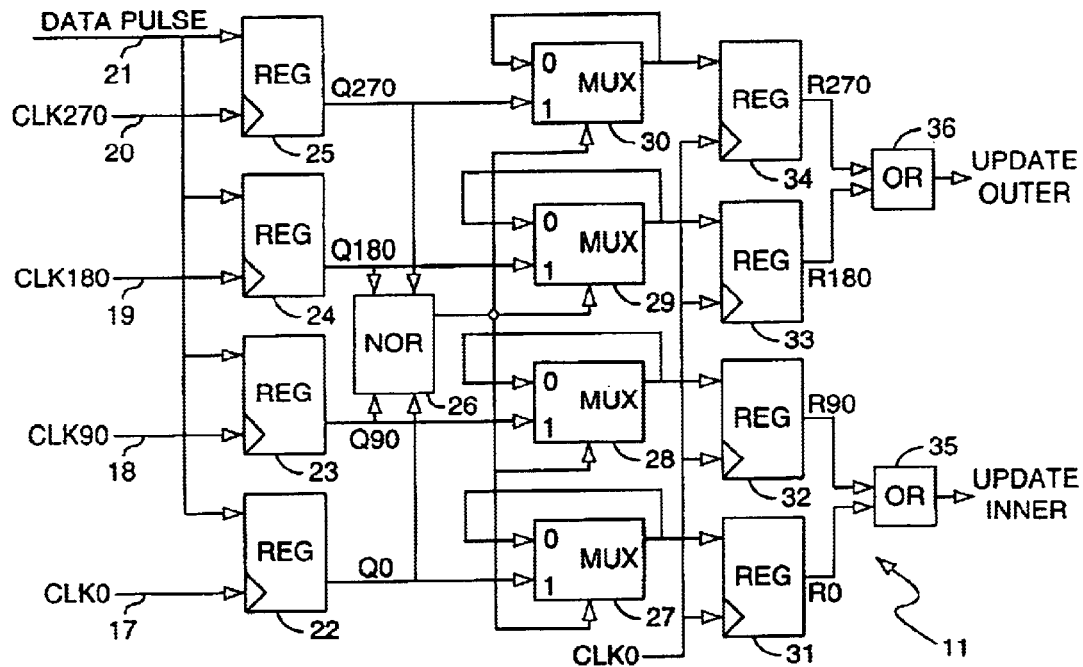
FIG. 6 is a schematic block diagram of the phase error determination element of FIG. 5 in more detail.

Further details of the phase error window block 11 are shown in FIG. 6, which shows the four quadrature clocks CLK0, CLK90, CLK180 and CLK270 and the data pulse signals being provided at inputs 17, 18, 19, 20 and 21, respectively. The data pulse is applied to a first set of four registers 22, 23, 24 and 25, each register being clocked with one of the four clock phases CLK0, CLK90, CLK180 and CLK270. For each data pulse, the output from the first set of four registers 22, 23, 24 and 25 will typically produce four pulses q0, q90, q180 and q270 spaced T/4 apart. The outputs of the four registers 22, 23, 24 and 25 are applied to a gate (e.g., a 4-input NOR gate) 26 and to a set of four multiplexers 27, 28, 29 and 30, respectively. The select lines of the multiplexers 27, 28, 29 and 30 are controlled by the output of the NOR gate 26 The outputs of the multiplexers 27, 28, 29 and 30 are fed back to their respective second inputs. The function of the multiplexers 27, 28, 29 and 30 and the 4-input NOR gate 26 is to provide a "1" at the output of the multiplexer coupled to the register which first clocked the data pulse input, and a "0" at all the other outputs.

The outputs of the respective multiplexers 27, 28, 29 and 30 are applied to respective inputs of four registers 31, 32, 33 and 34 forming a second set of registers. The second set of registers is clocked by the main system clock (e.g., CLK0). The outputs of the second set of registers are applied to two gates (e.g., OR gates) 35 and 36. By coupling the outputs of the appropriate registers 31, 32, 33 and 34 into the appropriate OR gates 35 and 36, the data pulses within appropriate phase windows are combined so that appropriate counters 12 or 13 are updated. In this case, the outputs of the registers 31 and 32, corresponding to the phase windows clocked by clocks CLK0 and CLK90, are coupled to the OR gate 35 to provide an "update inner" signal to counter 12 and the outputs of registers 33 and 34, corresponding to the phase windows clocked by clocks CLK180 and CLK270, are coupled to OR gate 36 to provide an "update outer" signal to counter 13. When no data edge pulses are present then no updates are made to the counters.

Figure 7:
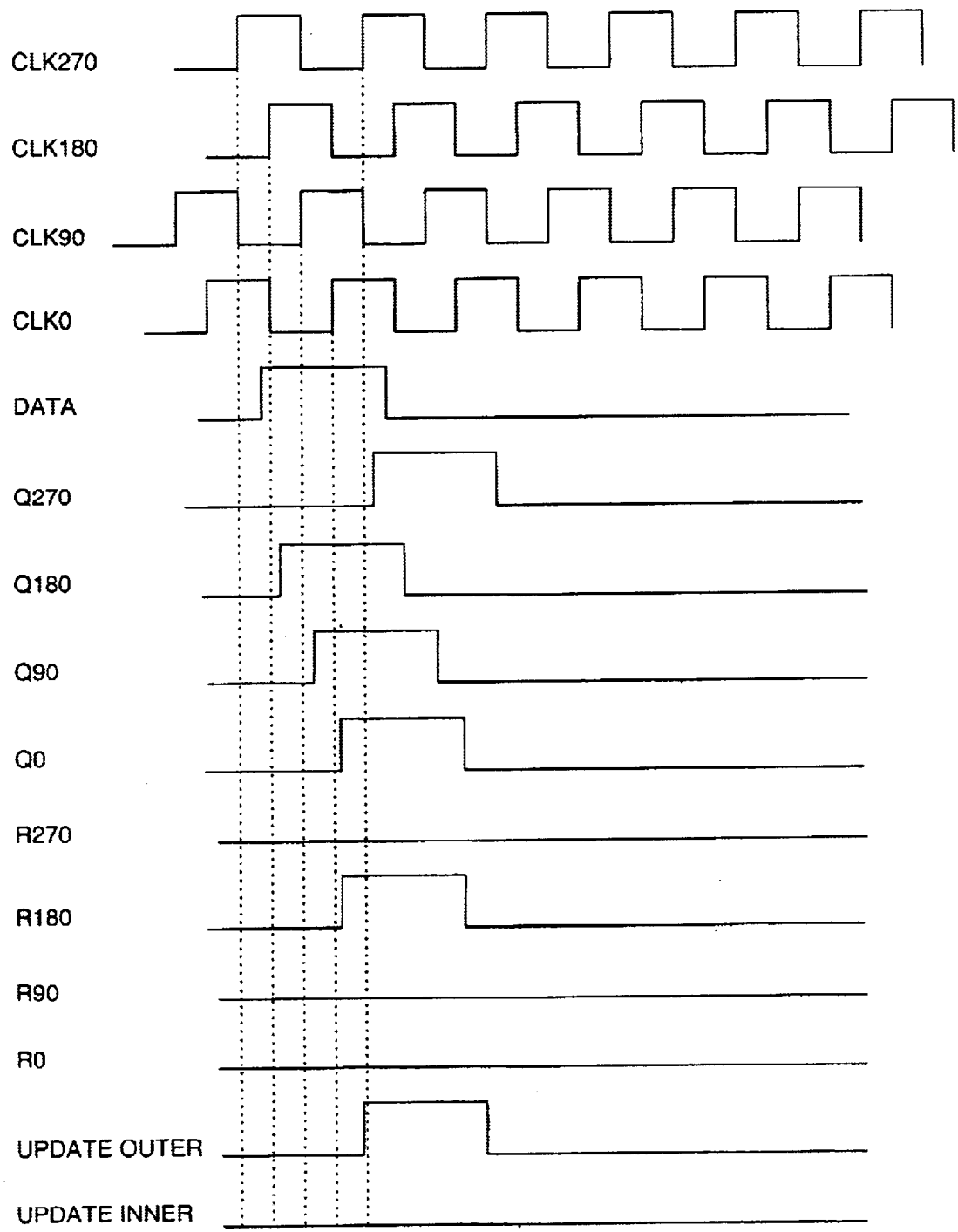
FIG. 7 is a timing diagram for the phase error determination element of FIG. 6.

FIG. 7 shows some of the signals for the circuit of FIG. 6 for an example data pulse. The four quadrature clocks are shown as CLK270, CLK180, CLK90 and CLK0. An input data pulse is shown as a data signal. The first of the four clock phases to clock the data pulse, in this example, is CLK180. This results in the output signal r180 from register 33 going high on the next positive edge of CLK0, while the output signals r270, r90 and r0 at the outputs of the registers 34, 32 sand 31 remain low. As a consequence of the output signal r180 going high, the "update outer" signal goes high, with the "update inner" signal remaining low, indicating that a phase error of magnitude >T/4 has occurred.

Figure 8:
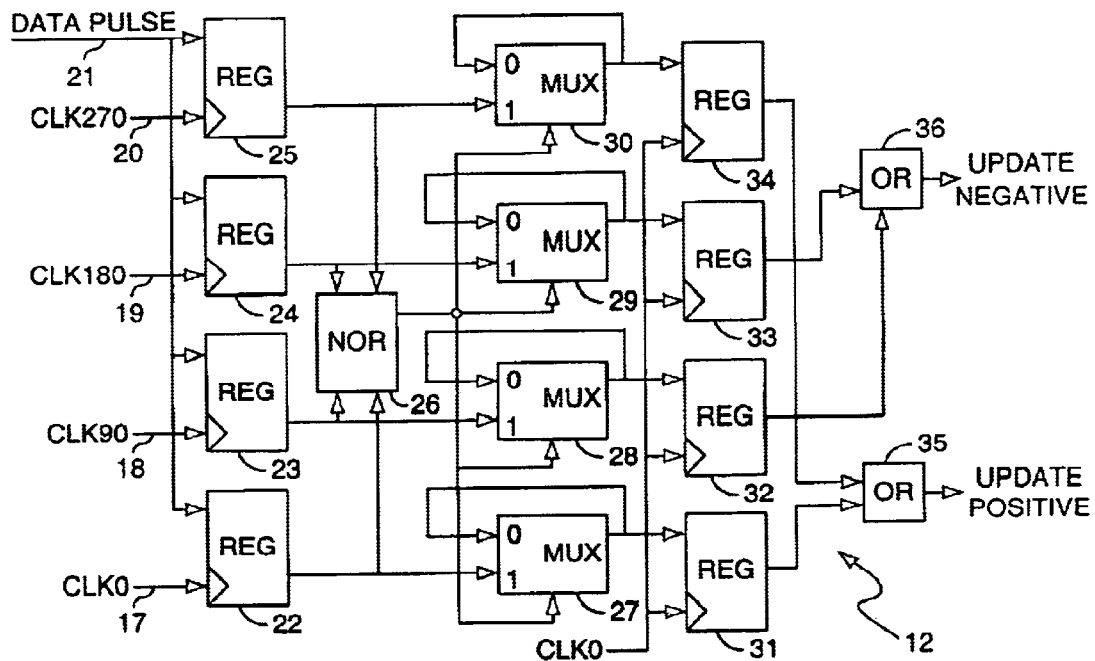
FIG. 8 is a schematic block diagram of a skew error determination element used in a second embodiment of an apparatus for estimating an error in a data recovery system according to the present invention.

The method and strategy described above can be readily adapted to provide a method for estimating any asymmetry/skew error between the clock and data pulses. In a system with no skew error, the data pulse position should jitter around the center of the clock window with zero mean. In a practical system, however, various noise imperfections can result in the mean jitter being non-zero. Such imperfections may degrade the data synchronizer window margin and hence overall system performance. It is desirable, therefore, to be able to identify any skew present to enable correction by some additional circuitry. A measurement of the skew present in the system can be achieved by a simple re-arrangement of the circuit of FIG. 6 so that one of the counters accumulates negative phase errors and the other positive phase errors. This circuit re-arrangement is shown in FIG. 8.

In this second embodiment, the apparatus 12 is used to calculate skew error, or asymmetry in the data window.

Otherwise all the elements that were described with reference to FIG. 6 are the same, and have been given the same reference numbers. However, the outputs of the registers in the second set have been rearranged so that the outputs of the registers 31 and 34, corresponding to the phase windows clocked by clocks CLK0 and CLK270, are coupled to OR gate 35 to provide an "update positive" signal and the outputs of registers 32 and 33, corresponding to the phase windows clocked by clocks CLK90 and CLK180, are coupled to OR gate 36 to provide an "update negative" signal. Again, when no data edge pulses are present then no update signals are provided to the counters.

For this embodiment, a minor modification is also required to the comparator 14 of FIG. 5, so that the result of the second (M-bit) counter 13 is latched when the first (N-bit) counter 12 reaches, for example, $2^{M+1}$. Any asymmetry will be reflected by the amount of deviation of the latched value relative to $2^{M+1}$. Clearly if the window is symmetric there should be an equal number of positive and negative phase errors. If the latched value is greater, then the asymmetry is positive and if the latched value is smaller, then the asymmetry is negative. This information can be supplied to additional circuitry which can be used to compensate for the asymmetry effects and re-center the clock window.

While the invention has been particularly shown and described with reference to the preferred embodiments thereof, it will be understood by those skilled in the art that various changes in form and details may be made without departing from the spirit and scope of the invention.

What is claimed is:

1. A method of estimating an error in a data recovery system, comprising the steps of:

(A) receiving one or more data pulses each having a data rate;

(B) receiving a plurality of clock signals each having a rate similar to the data rate and having a substantially equal phase offset from each other;

(C) clocking the one or more data pulses with each of the plurality of clock signals to determine a particular offset of each of the one or more data pulses;

(D) counting a number of said one or more data pulses received at different phase offsets;

(E) providing a value representing a ratio of the counts at different clock phase offsets; and (F) determining said error for the received data pulses in response to the value.

2. The method according to claim 1, wherein step (C) further comprises the sub-steps of:

(C-1) applying the one or more data pulses to each of a plurality of registers, each clocked by a different one of the plurality of clock signals; and (C-2) determining which of the plurality of registers first clocks each of the one or more data pulses.

3. The method according to claim 2, wherein step (C) further comprises the sub-steps of:

(C-3) incrementing one of a plurality of counters each time a register associated with a particular counter is determined to have first clocked a particular data pulse; and (C-4) determining the count of at least one counter when at least one other, counter reaches a predetermined value.

4. The method according to claim 1, wherein step (F) further comprises:

checking a look-up table for an error rate corresponding to the value.

5. The method according to claim 4, wherein step CD) further comprises the sub-step of:

(D-1) incrementing a first counter when a first one or more of said plurality of clock signals comprises a first predetermined phase offset for a particular data pulse or incrementing a second counter when a second one or more of said plurality of clock signals comprises a second predetermined phase offset for a particular data pulse.

6. The method according to claim 5, wherein step (D) further comprises the sub-step of:

(D-2) determining when one of the two counters reaches a predetermined value; and (D-3) determining the count of the other of the two counters; and (D-4) determining an error rate from a look-up table in response to said count of the other counter.

7. The method according to claim 1, wherein step (D) further comprises the sub-steps of:

(D-1) incrementing a first counter when a first one or more of said plurality of clock signals comprises a first predetermined phase offset for a particular data pulse or incrementing a second counter when a second one or more of said plurality of clock signals comprises a second predetermined phase offset for a particular data pulse;

(D-2) determining when one of the two counters reaches a predetermined value; and (D-3) determining the count of the other of the two counters; and wherein the count of the other counter is then compared to the predetermined value and used to determine whether a skew error is positive or negative.

8. An apparatus for estimating an error in a data recovery system, comprising:

a circuit configured to receive data pulses at a data rate and a plurality of clock signals each having a rate similar to the data rate and having a substantially equal phase offset from each other;

a data clocking device configured to receive said data pulses and said plurality of clock signals and provide a plurality count signals, when a data pulse is clocked by a clock signal at an associated clock input for counting the number of data pulses received at different phase offsets and to provide a value representing a ratio of the counts at different clock phase offsets; and a plurality of counters each configured to receive one or more of said count signals, wherein said device is configured to provide an error for the received data pulses based on the counts at different clock phase offsets.

9. The apparatus according to claim 8, wherein the data clocking comprises:

a plurality of registers each configured to receive said data pulse and one or more of said plurality of clock inputs; and a discriminating device coupled to said plurality of registers, wherein one or more of the plurality of registers is configured to provide a count signal for each data pulse received depending on which register is first to clock the particular data pulse.

10. The apparatus according to claim 9, wherein a first counter has a maximum value and is configured to provide an indication when the maximum value is reached.

11. The apparatus according to claim 10, further comprising:

a second counter configured to provide an indication of the value reached when the first counter reaches the maximum value.

12. The apparatus according to according to claim 11, wherein there are four registers, each receiving one of the four clock signals at the second input thereof.

13. The apparatus according to claim 12, wherein the discriminating device comprises:

one or more logic gates, coupled to one or more registers;

one or more multiplexers each coupled to an output of said one or more registers and one or more of said logic gates; and a second one or more registers each coupled to an output of said one or more multiplexers.

14. The apparatus according to claim 13, wherein the first OR gate has a first and a second input coupled to the outputs of the two second registers corresponding to the two registers clocked by clock signals having phase offsets of 0° and 90° and the second OR gate has a first and a second input coupled to the outputs of the two second registers corresponding to the two registers clocked by clock signals having phase offsets of 180° and 270°.

15. The apparatus according to claim 14, wherein a first counter is incremented when either one of two registers clocked by clock signals having phase offsets of 0° and 90° first clocks a particular data pulse and a second counter is incremented when either one of two registers clocked by clock signals having phase offsets of 180° and 270° first clocks a particular data pulse.

16. The apparatus according to claim 15, wherein the device includes a look-up table which provides an error rate for the received data pulses based on the ratio of the values of the two counters.

17. The apparatus according to claim 13, wherein the first OR gate has a first and a second input coupled to the outputs of the two second registers corresponding to the two registers clocked by clock signals having phase offsets of 0° and 270° and the second OR gate has a first and a second input coupled to the outputs of the two second registers corresponding to the two registers clocked by cloak signals having phase offsets of 90° and 180°.

18. The apparatus according to claim 17, wherein a first counter is incremented when either one of two registers clocked by clock signals having phase offsets of 0° and 270° first clocks a particular data pulse and a second counter is incremented when either one of two registers clocked by clock signals having phase offsets of 90° and 180° first clocks a particular data pulse.

19. The apparatus according to claim 18, wherein the device includes a comparator to determine which of the two counters has a higher value so as to provide an indication of whether a skew error is positive or negative.

* * * * *